United States Patent
Spofford et al.

(10) Patent No.: US 11,549,006 B2
(45) Date of Patent: Jan. 10, 2023

(54) HIGH MELT STRENGTH POLYPROPYLENE WITH HIGH STIFFNESS AND CLARITY

(71) Applicant: ExxonMobil Chemical Patents Inc., Baytown, TX (US)

(72) Inventors: Caitlin A. Spofford, Houston, TX (US); George J. Pehlert, Houston, TX (US); Anthony Poloso, Marriottsville, MD (US); Adrian G. Barry, Houston, TX (US); John M. Donahue, Greenville, SC (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 467 days.

(21) Appl. No.: 16/613,468

(22) PCT Filed: Apr. 27, 2018

(86) PCT No.: PCT/US2018/029763
§ 371 (c)(1),
(2) Date: Nov. 14, 2019

(87) PCT Pub. No.: WO2018/222310
PCT Pub. Date: Dec. 6, 2018

(65) Prior Publication Data
US 2020/0325320 A1    Oct. 15, 2020

Related U.S. Application Data

(60) Provisional application No. 62/512,335, filed on May 30, 2017.

(30) Foreign Application Priority Data
Jul. 12, 2017  (EP) ..................... 17180912

(51) Int. Cl.
| C08L 23/14  | (2006.01) |
| C08L 23/08  | (2006.01) |
| B29C 48/00  | (2019.01) |
| B29K 23/00  | (2006.01) |
| B29K 105/00 | (2006.01) |

(52) U.S. Cl.
CPC .......... *C08L 23/14* (2013.01); *B29C 48/0012* (2019.02); *B29C 48/022* (2019.02); *C08L 23/0815* (2013.01); *B29K 2023/12* (2013.01); *B29K 2105/0067* (2013.01); *C08L 2201/10* (2013.01); *C08L 2203/30* (2013.01); *C08L 2314/02* (2013.01)

(58) Field of Classification Search
CPC .. C08L 23/14; C08L 23/0815; C08L 2314/02; C08L 2201/10; C08L 2203/30; B29C 48/022; B29C 48/0012; B29K 2105/0067
See application file for complete search history.

(56) References Cited

U.S. PATENT DOCUMENTS

| 5,670,595 | A | 9/1997 | Meka et al. |
| 6,350,828 | B1 | 2/2002 | Takaoka et al. |
| 6,503,993 | B1 | 1/2003 | Huovinen et al. |
| 9,068,030 | B2 | 6/2015 | Song et al. |
| 9,290,600 | B2 | 3/2016 | Prokschi et al. |
| 9,410,034 | B2 | 8/2016 | Klimke et al. |
| 9,453,093 | B2 | 9/2016 | Meka et al. |
| 2004/0122196 | A1* | 6/2004 | Pierini .................. C08L 23/12 526/351 |
| 2009/0030098 | A1 | 1/2009 | Gagnani et al. |
| 2015/0291755 | A1* | 10/2015 | Abubakar ............... C08K 3/01 526/348 |
| 2016/0200839 | A1 | 7/2016 | Vestberg et al. |

FOREIGN PATENT DOCUMENTS

| CN | 1566164 A | 1/2005 |
| CN | 102816271 A | 12/2012 |
| EP | 0919572 A | 6/1999 |
| EP | 3018156 A | 5/2016 |
| WO | 2013/004507 A | 1/2013 |
| WO | WO 2015/200586 | 12/2015 |
| WO | 2017/095501 A | 6/2017 |

\* cited by examiner

*Primary Examiner* — Robert D Harlan
(74) *Attorney, Agent, or Firm* — Vorys, Sater, Seymour and Pease LLP

(57) ABSTRACT

A polypropylene comprising within a range from 0.1 wt % to 4 wt % ethylene and/or C4 to C12 α-olefin derived units, one or more clarifiers, or both; wherein the polypropylene has a flexural modulus of at least 200 kpsi (0.05 in/min ASTM D790(A)) and an Mz/Mw of at least 4. The polypropylenes may be made by combining propylene and a comonomer with a Ziegler-Natta catalyst and at least two external electron donors, wherein the concentration of the electron donors is within a range from 1 to 100 ppm. The concentration of electron donors may be decreased to control the haze level of the polypropylene, and/or the level of comonomer derived units may be controlled to reduce the haze level of the polypropylene.

24 Claims, No Drawings

HIGH MELT STRENGTH POLYPROPYLENE WITH HIGH STIFFNESS AND CLARITY

CROSS-REFERENCE OF RELATED APPLICATIONS

This application is a National Phase Application claiming priority to PCT Application Ser. No. PCT/US2018/029763 filed Apr. 27, 2018, which claims priority to U.S. Provisional Application No. 62/512,335, filed May 30, 2017, and EP 17180912.2 which was filed Jul. 12, 2017, the disclosures of which are incorporated herein by reference.

FIELD OF THE INVENTION

The present disclosure relates to polypropylenes having a broad molecular weight distribution and a high molecular weight component, and in particular to polypropylenes having a minor amount of comonomer and/or clarifying agents to improve clarity while maintaining stiffness.

BACKGROUND

Polypropylene is increasingly used as a base material in thermoforming processes. Its use is only recently becoming realized as a foamable polymer as well. However, most polypropylenes do not have the melt strength to be of optimal use in thermoforming where sagging of the melt can be a problem in operations to make thermoformed articles. And in foaming, polypropylene typically does not have the melt strength and extensional viscosity to allow formation of cavities for the hardened "foam" material.

However, the inventors have found that certain polypropylenes having a high molecular weight component have improved melt strength and extensional viscosity, allowing for the improved manufacture of thermoformed articles and/or foamed articles. Ideally, these materials will be stiff as evidenced by a high flexural modulus. What is needed is a polypropylene material having both a high melt strength and high stiffness, but also improved clarity. Current clear polypropylene materials are useful in a number of thermoformed articles, but to get the desired stiffness, such articles must have a relatively high thickness and weight. What is also needed is a polypropylene that will allow for down-gauging but maintain its stiffness and clarity. The inventors have developed such materials, described herein.

Relevant publications include U.S. Pat. Nos. 9,453,093; 9,410,034; 9,290,600; 9,068,030; 6,503,993; 6,350,828; 5,670,595; WO 2013/004507; EP 0 919 572 A1; and EP 3 018 156 A1.

SUMMARY

Disclosed herein is a polypropylene comprising (or consisting essentially of, or consisting of) within a range from 0.1 wt % to 3, or 4 wt % ethylene and/or C4 to C12 α-olefin derived units, one or more clarifiers, or both; wherein the polypropylene has a flexural modulus of at least 200 kpsi (1380 MPa) (0.05 in/min ASTM D790 (A)) and an Mz/Mw of at least r, or 5, wherein the polypropylene is reactor grade. Other suitable ranges and embodiments are disclosed herein.

In any embodiment the polypropylenes described herein are made by combining propylene and optionally a comonomer (ethylene and/or C4 to C12 α-olefin) with a Ziegler-Natta catalyst and at least two external electron donors, preferably simultaneously (e.g., present together in the same reactor and/or reaction zone), wherein the concentration of the electron donors is within a range from 1 to 100 ppm. In any embodiment the concentration of electron donors is decreased to reduce the haze of the polypropylene. Additionally, or alternatively, the level of comonomer (ethylene and/or C4 to C12 α-olefin) is increased to reduce the haze of the polypropylene.

Also in any embodiment reactor grade pellets of the polypropylene are produced in a single-stage slurry process using a Ziegler-Natta type catalyst, meaning that the conditions in the reactor(s) such as temperature and hydrogen or other chain terminating agent concentration are not changed to effect any property of the final polypropylene from the catalyst and propylene entering the reactor to the polypropylene leaving the reactor.

Also in any embodiment is a process for forming a polypropylene having a flexural modulus of at least 200 kpsi (1380 MPa) (0.05 in/min ASTM D790(A)) and an Mz/Mw of at least 4 comprising (or consisting of, or consisting essentially of) combining propylene and optionally a comonomer with a Ziegler-Natta catalyst and at least two external electron donors.

DETAILED DESCRIPTION

It has been found that introducing defects into the crystal structure of certain polypropylenes, such as by adding comonomer and/or adding clarifying agents, that the stiffness of the polypropylene can be maintained while improving clarity. This allows for down-gauging by as much as 10 or 20% or more in the polypropylene material and/or thickness of the material in making desirable articles. Thus, food containers and packaging materials can be made lighter without losing their stiffness and durability. The polypropylenes described herein are particularly useful for any formed articles where clarity is desired, especially thermoformed articles, sheets, and films, and articles comprising sheets and films of materials. Examples of desirable articles include food containers, bottles, compact disc containers, medical containers and equipment, casings for electronic devices, and other consumer and commercial goods.

As used herein, the term "clarifier" or "clarifying agent" refers to a chemical agent that improves (lowers) the haze of a polyolefin sample as tested per ASTM D1003; most preferably, the agent is one that increases the rate of crystallization of the polyolefin relative to the polyolefin without the agent. The agent may take on any suitable form such as those chemical agents known in the art, including benzoate salts, sorbitols, organic phosphates, norbornyl diacids, metal tert-butylbenzoate, and other compounds having properties described by K. Hoffman, G. Hubber and D. Mäder in 176 MACROMOL. SYMP. 83-91 (2001). Most preferably the clarifying agents used herein have a molecular weight of less than 1000, or 800, or 500 g/mole, and preferably at least 50, 80, or 100 g/mole. The clarifying agent may also increase the stiffness of the polyolefin.

Thus disclosed in any embodiment is a polypropylene comprising (or consisting essentially of, or consisting of) within a range from 0.1 wt % to 3, or 4 wt % ethylene and/or C4 to C12 α-olefin derived units, one or more clarifiers, or both; wherein the polypropylene has a flexural modulus of at least 200 (1380), or 250 kpsi (1720 MPa) (0.05 in/min ASTM D790 (A)) and an Mz/Mw of at least 4, or 4.5, or 5, or 5.5, or 6. In any embodiment, the one or more clarifiers are present within a range from 50, or 100 ppm to 2500, or 3000, or 4000, or 4500, or 5000 ppm.

The polypropylene described herein may be described by any number and/or combination of features. For instance, in any embodiment the polypropylene has a melt flow rate (MFR, 230° C./2.16 kg) within a range from 0.5, or 1 g/10 min to 10, or 20 g/10 min.

In any embodiment the polypropylene has a melt strength (190° C.) of at least 5, or 10, or 20, or 30 cN, or within a range from 10, or 20, or 30 cN to 40, or 50, or 60, or 80 cN. Also, in any embodiment the polypropylene has a peak extensional viscosity (annealed) within a range from 10, or 20 kPa·s to 40, or 50, or 55, or 60 kPa·s at a strain rate of 0.01/sec (190° C.). The "peak extensional viscosity" is the difference between the highest value for the extensional viscosity and the linear viscoelastic response (LVE). The melt strength is determined using a capillary rheometer such as a Rheo-Tester™ 1000 capillary rheometer in conjunction with a wheel-driven extensional rheometer such as a Rheotens™ 71.97, where the capillary rheometer is set at a temperature of 190° C., the die a 30/2 (mm) ratio die, the piston speed at 0.28 mm/s, and the shear rate at 40 sec$^{-1}$, and where the strand (vertical) has a length of 100 mm, set at a velocity of 10 mm/s. For the measurement of the extensional viscosity, the extensional rheometer has a gap of 0.7 mm using a grooved wheel at an acceleration of 12 mm/s$^2$. The velocity of the rotating rollers increases at a constant acceleration rate until the polymer melt breaks. The force at which the polymer melt breaks is the "melt strength". To anneal, a polypropylene sample is heated to around 200° C. for 3 min to melt the polypropylene without pressure. Then, 1500 psi pressure is applied while the sample was kept heated for another 3 min between two plates. Afterwards, the pressure applied to the sample is removed while the sample was kept heated at 200° C. for another 20 min After 20 min, the sample is cooled down with water circulation without any pressure applied for additional 20 min to a temperature of 20° C.

In any embodiment, the polypropylene has a weight average molecular weight (Mw) of at least 300, or 400 kg/mole, or within a range from 300, or 400 kg/mole to 500, or 600, or 800 kg/mole. In any embodiment, the polypropylene has a number average molecular weight (Mn) of at least 20 kg/mole, or 30 kg/mole, or within a range from 20, or 30 kg/mole to 50, or 60, or 80 kg/mole. In any embodiment, the polypropylene has a molecular weight distribution (Mw/Mn) of at least 8, or 9, or 10, or 11; or within a range from 8, or 9, or 10, or 11 to 12, or 14, or 16, or 18. These molecular weight features are determined using gel permeation chromatography as described below.

In any embodiment, the polypropylene has a z-average molecular weight (Mz) of at least 1000, or 1500, or 2000 kg/mole, or within a range from 1000, or 1500, or 2000 kg/mole to 2500, or 3000, or 3500 kg/mole. Further, in any embodiment the Mz/Mn is within a range from 5, or 5.5, or 6 to 10, or 12, or 16. Also, in any embodiment the polypropylene has an Mz+1 value of at least 4,800, or 5,000 kg/mole; or within a range from 4,800, or 5,000 kg/mole to 6,000, or 6,500, or 7,000 kg/mole.

In any embodiment, the polypropylenes have a g'$_{vis}$ value (branching index) of at least 0.97, or 0.98, or 0.99, indicating linear polypropylene chains.

The polypropylene maintains a certain desirable level of crystallinity as indicated by its thermal properties. In any embodiment the polypropylene has a melting point temperature ($T_m$) of at least 154, or 156, or 158° C.; or within a range from 154, or 156, or 158, or 160, or 162° C. to 166, or 168, or 170, or 175° C. In any embodiment the polypropylene has a crystallization temperature ($T_c$) of at least 110° C.; or within a range from 110, or 114, or 120, or 122° C. to 128, or 130° C. These thermal properties are determined as described below using differential scanning calorimetry (DSC).

The polypropylenes described herein have certain desirable properties, especially low haze and high stiffness as indicated in the flexural modulus value. In any embodiment the polypropylene has a clarity of at least 80, or 85, or 90%, and in any embodiment has a haze of less than 60, or 55, or 50%, all as measured by ASTM D1003. In any embodiment the polypropylene has a flexural modulus (1% secant) of at least 200 (1380), or 250 kpsi (1720 MPa) (0.05 in/min ASTM D790 (A)), or within a range from 200 (1380), or 250 kpsi (1720 MPa) to 400 (2760 MPa), or 500 kpsi (3450 MPa).

Any desirable method of forming polypropylenes as is known in the art can be used to make the polypropylene described herein. In any embodiment the polypropylene is made by combining propylene and optionally a comonomer (ethylene and/or C4 to C12 α-olefin) with a Ziegler-Natta catalyst and at least two external electron donors, wherein the concentration of the electron donors is within a range from 1 to 100 ppm. Desirably, the concentration of electron donors may be decreased to reduce the haze of the polypropylene. Also, the level of comonomer (ethylene and/or C4 to C12 α-olefin) combined with the propylene, thus effecting the level of comonomer derived units in the polypropylene, may be increased to reduce the haze of the polypropylene. For instance, in changing the overall concentration of external electron donor from 5 to 20 ppm to a level of 30 to 50 or 60 ppm, the haze of the final polypropylene can be reduced such as to less than 60, or 50%. Also for instance, in changing the comonomer derived unit level of the polypropylene from 0 to 0.4 wt % to a level of 0.6 or 1 wt % to 3 or 4 wt % the haze can be reduced such as to less than 60, or 50%. The comonomer level and level of external electron donors can be changed individually or together, sequentially or at the same time during the polymerization process. In any embodiment, the external electron donors are combined with the catalyst simultaneously, such as together in the same reaction zone or reactor.

In any embodiment, the polypropylenes described herein are formed in the absence of dienes and/or vinyl compounds such as vinyl cycloalkanes, in particular vinyl cyclohexane, vinyl cyclopentane, vinyl-2-methyl cyclohexane and vinyl norbornane, 3-methyl-1-butene, styrene, p-methyl-styrene, 3-ethyl-1-hexene, butadiene, 1,9-decadiene, or mixtures thereof. Stated another way, in any embodiment the polypropylenes consist of monomer units derived from propylene and optionally ethylene and/or C4 to C12 α-olefins.

Ziegler-Natta catalysts suitable to produce the useful polypropylenes include solid titanium supported catalyst systems described in U.S. Pat. Nos. 4,990,479; 5,159,021; 9,453,093; and WO 00/63261, and others. Briefly, the Ziegler-Natta catalyst can be obtained by: suspending a dialkoxy magnesium compound in an aromatic hydrocarbon that is liquid at 20 to 25° C.; contacting the dialkoxy magnesium hydrocarbon composition with a titanium halide and with a diester of an aromatic dicarboxylic acid; and contacting the resulting functionalized dialkoxy magnesium-hydrocarbon composition of step with additional titanium halide.

The "catalyst system" typically includes a solid titanium catalyst component comprising titanium as well as magnesium, halogen, at least one non-aromatic "internal" electron donor, and at least one, preferably two or more "external" electron donors. The solid titanium catalyst component, also referred to as a Ziegler-Natta catalyst, can be prepared by contacting a magnesium compound, a titanium compound, and at least the internal electron donor. Examples of the titanium compound used in the preparation of the solid titanium catalyst component include tetravalent titanium compounds having the formula (1):

$$Ti(OR_n)X_{4-n}, \qquad (1)$$

wherein R is a hydrocarbyl radical, X is a halogen atom, and n is from 0 to 4.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition, two or more such hydrocarbyl radicals may together form a fused ring system, including partially or fully hydrogenated fused ring systems, which may include heterocyclic radicals.

Preferably, the halogen-containing titanium compound is a titanium tetrahalide, or titanium tetrachloride. The titanium compounds may be used singly or in combination with each other. The titanium compound may be diluted with a hydrocarbon compound or a halogenated hydrocarbon compound. Non-limiting examples include titanium tetra-halides such as $TiCl_4$, $TiBr_4$, and/or $TiI_4$; alkoxy titanium trihalides including $Ti(OCH_3)Cl_3$, $Ti(OC_2H_5)Cl_3$, $Ti(O-n-C_4H_9)Cl_3$, $Ti(OC_2H_5)Br_3$, and/or $Ti(O-iso-C_4H_9)Br_3$; dialkoxytitanium dihalides including $Ti(OCH_3)_2Cl_2$, $Ti(OC_2H_5)_2Cl_2$, $Ti(O-n-C_4H_9)_2Cl_2$ and/or $Ti(OC_2H_5)_2Br_2$; trialkoxytitanium monohalides including $Ti(OCH_3)_3Cl$, $Ti(OC_2H_5)_3Cl$, $Ti(O-n-C_4H_9)_3Cl$ and/or $Ti(OC_2H_5)_3Br$; and/or tetraalkoxy titaniums including $Ti(OCH_3)_4$, $Ti(OC_2H_5)_4$, and/or $Ti(O-n-C_4H_9)_4$.

Preferably, the magnesium compound to be used in the preparation of the solid titanium catalyst component includes a magnesium compound having reducibility and/or a magnesium compound having no reducibility. Suitable magnesium compounds having reducibility may, for example, be magnesium compounds having a magnesium-carbon bond or a magnesium-hydrogen bond. Suitable examples of such reducible magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. These magnesium compounds may be used singly or they may form complexes with the organoaluminum co-catalyst as described herein. These magnesium compounds may be a liquid or a solid.

Suitable examples of the magnesium compounds having no reducibility include magnesium halides such as magnesium chloride, magnesium bromide, magnesium iodide, and magnesium fluoride; alkoxy magnesium halides, such as magnesium methoxy chloride, magnesium ethoxy chloride, magnesium isopropoxy chloride, magnesium phenoxy chloride, and magnesium methylphenoxy chloride; alkoxy magnesiums, such as ethoxy magnesium, isopropoxy magnesium, butoxy magnesium, n-octoxy magnesium, and 2-ethylhexoxy magnesium; aryloxy magnesiums such as phenoxy magnesium and dimethylphenoxy magnesium; and/or magnesium carboxylates, such as magnesium laurate and magnesium stearate.

Non-reducible magnesium compounds may be compounds derived from the magnesium compounds having reducibility, or may be compounds derived at the time of preparing the catalyst component. The magnesium compounds having no reducibility may be derived from the compounds having reducibility by, for example, contacting the magnesium compounds having reducibility with polysiloxane compounds, halogen-containing silane compounds, halogen-containing aluminum compounds, esters, alcohols, and the like.

The magnesium compounds having reducibility and/or the magnesium compounds having no reducibility may be complexes of the above magnesium compounds with other metals, or mixtures thereof with other metal compounds. They may also be mixtures of two or more types of the above compounds. Further, halogen-containing magnesium compounds, including magnesium chloride, alkoxy magnesium chlorides and aryloxy magnesium chlorides may be used.

Supported Ziegler-Natta catalysts may be used in combination with a co-catalyst, also referred to herein as a Ziegler-Natta co-catalyst. Compounds containing at least one aluminum-carbon bond in the molecule may be utilized as the co-catalysts, also referred to herein as an organoaluminum co-catalyst. Suitable organoaluminum compounds include organoaluminum compounds of the general formula (2):

$$R^1{}_mAl(OR^2)\_n H_p X_q, \qquad (2)$$

wherein $R^1$ and $R^2$ are identical or different, and each represents a hydrocarbyl radical containing from 1 to 15 carbon atoms, or 1 to 4 carbon atoms; X represents a halogen atom; and m is 1, 2, or 3; n is 0, 1, or 2; p is 0, 1, 2, or 3; and q is 0, 1, or 2; and wherein m+n+p+q=3.

Other suitable organoaluminum compounds include complex alkylated compounds of metals of Group I of the Period Table (lithium, etc.) and aluminum represented by the general formula (3):

$$M^1AlR^1{}_4, \qquad (3)$$

wherein $M^1$ is the Group I metal such as Li, Na, or K, and $R^1$ is as defined in formula (2). Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesqui-butoxide; partially alkoxylated alkyl aluminums having an average composition represented by the general formula $R^1{}_{2.5}Al(OR^2)_{0.5}$; partially halogenated alkyl aluminums, for example, alkyl aluminum dihalides such as ethyl aluminum dichloride, propyl aluminum dichloride and butyl aluminum dibromide; partially hydrogenated alkyl aluminums, for example, alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride, and ethyl aluminum ethoxybromide.

Electron donors are present with the metal components described above in forming the catalyst suitable for producing the polypropylenes described herein. Both "internal" and "external" electron donors are desirable for forming the catalyst suitable for making the polypropylene described herein. More particularly, the internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids.

More preferably, the one or more internal donors are non-aromatic. The non-aromatic internal electron donor may comprise an aliphatic amine, amide, ester, ether, ketone, nitrile, phosphine, phosphoramide, thioethers, thioester, aldehyde, alcoholate, carboxylic acid, or a combination thereof.

Even more preferably, the non-aromatic internal electron donor(s) comprises a $C_1$ to $C_{20}$ diester of a substituted or unsubstituted $C_2$ to $C_{10}$ dicarboxylic acid. The non-aromatic internal electron donor(s) may be one or more succinate compounds according to formula (4):

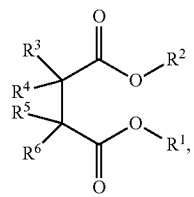

(4)

wherein $R^1$ and $R^2$ are independently $C_1$ to $C_{20}$ linear or branched alkyl, alkenyl, or cycloalkyl hydrocarbyl radicals; and $R^3$ to $R^6$ are independently, hydrogen, halogen, or $C_1$ to $C_{20}$ linear or branched alkyl, alkenyl, or cycloalkyl hydrocarbyl radicals, wherein the $R^3$ to $R^6$ radicals are not joined together, wherein at least two of the $R^3$ to $R^6$ radicals are joined to form a cyclic divalent radical, or a combination thereof.

The $R^3$ to $R^5$ groups of formula (4) may be hydrogen and $R^6$ may be a radical selected from the group consisting of a primary branched, secondary or tertiary alkyl, or cycloalkyl radical having from 3 to 20 carbon atoms.

The internal donor may be a monosubstituted non-aromatic succinate compound. Suitable examples include diethyl-secbutylsuccinate, diethylhexylsuccinate, diethyl-cyclopropylsuccinate, diethyl-trimethylsilylsuccinate, diethyl-methoxysuccinate, diethyl-cyclohexylsuccinate, diethyl-(cyclohexylmethyl) succinate, diethyl-t-butylsuccinate, diethyl-isobutylsuccinate, diethyl-isopropylsuccinate, diethyl-neopentylsuccinate, diethyl-isopentylsuccinate, diethyl-(1,1,1-trifluoro-2-propyl) succinate, diisobutyl-sec-butylsuccinate, diisobutylhexylsuccinate, diisobutyl-cyclopropylsuccinate, diisobutyl-trimethylsilylsuccinate, diisobutyl-methoxysuccinate, diisobutyl-cyclohexylsuccinate, diisobutyl-(cyclohexylmethyl) succinate, diisobutyl-t-butylsuccinate, diisobutyl-isobutylsuccinate, diisobutyl-isopropylsuccinate, diisobutyl-neopentylsuccinate, diisobutyl-isopentylsuccinate, diisobutyl-(1,1,1-trifluoro-2-propyl) succinate, dineopentyl-sec-butylsuccinate, dineopentyl hexylsuccinate, dineopentyl cyclopropylsuccinate, dineopentyl trimethylsilylsuccinate, dineopentyl methoxysuccinate, dineopentyl cyclohexylsuccinate, dineopentyl (cyclohexylmethyl) succinate, dineopentyl t-butylsuccinate, dineopentyl isobutylsuccinate, dineopentyl isopropylsuccinate, dineopentyl neopentylsuccinate, dineopentyl isopentylsuccinate, and/or dineopentyl (1,1,1-trifluoro-2-propyl) succinate.

The internal electron donor having a structure consistent with formula (4) may comprise at least two radicals from $R^3$ to $R^6$, which are different from hydrogen and are selected from $C_1$ to $C_{20}$ linear or branched alkyl, alkenyl, and/or cycloalkyl hydrocarbyl groups, which may contain heteroatoms. Two radicals different from hydrogen may be linked to the same carbon atom. Suitable examples include 2,2-disubstituted succinates including diethyl-2,2-dimethylsuccinate, diethyl-2-ethyl-2-methylsuccinate, diethyl-2-(cyclohexylmethyl)-2-isobutylsuccinate, diethyl-2-cyclopentyl-2-n-propylsuccinate, diethyl-2,2-diisobutylsuccinate, diethyl-2-cyclohexyl-2-ethylsuccinate, diethyl-2-isopropyl-2-methylsuccinate, diethyl-2,2-diisopropyl-diethyl-2-isobutyl-2-ethylsuccinate, diethyl-2-(1,1,1-trifluoro-2-propyl)-2-methylsuccinate, diethyl-2-isopentyl-2-isobutylsuccinate, diisobutyl-2,2-dimethylsuccinate, diisobutyl-2-ethyl-2-methylsuccinate, diisobutyl-2-(cyclohexylmethyl)-2-isobutylsuccinate, diisobutyl-2-cyclopentyl-2-n-propylsuccinate, diisobutyl-2,2-diisobutylsuccinate, diisobutyl-2-cyclohexyl-2-ethylsuccinate, diisobutyl-2-isopropyl-2-methylsuccinate, diisobutyl-2-isobutyl-2-ethylsuccinate, diisobutyl-2-(1, 1,1-trifluoro-2-propyl)-2-methylsuccinate, diisobutyl-2-isopentyl-2-isobutylsuccinate, diisobutyl-2,2-diisopropylsuccinate, dineopentyl-2,2-dimethylsuccinate, dineopentyl-2-ethyl-2-methylsuccinate, dineopentyl-2-(cyclohexylmethyl)-2-isobutylsuccinate, dineopentyl-2-cyclopentyl-2-n-propylsuccinate, dineopentyl-2,2-diisobutylsuccinate, dineopentyl-2-cyclohexyl-2-ethylsuccinate, dineopentyl-2-isopropyl-2-methylsuccinate, dineopentyl-2-isobutyl-2-ethylsuccinate, dineopentyl-2-(1, 1,1-trifluoro-2-propyl)-2-methylsuccinate, dineopentyl 2,2-diisopropylsuccinate, and/or dineopentyl 2-isopentyl-2-isobutylsuccinate.

The at least two radicals different from hydrogen may be linked to different carbon atoms between $R^3$ and $R^6$ in formula (4). Examples include $R^3$ and $R^5$ or $R^4$ and $R^6$. Suitable non-aromatic succinate compounds such as this include: diethyl-2,3-bis(trimethylsilyl) succinate, diethyl-2, 2-sec-butyl-3-methylsuccinate, diethyl-2-(3,3,3-trifluoro-propyl)-3-methylsuccinate, diethyl-2,3-bis(2-ethylbutyl) succinate, diethyl-2,3-diethyl-2-isopropylsuccinate, diethyl-2,3-diisopropyl-2-methylsuccinate, diethyl-2,3-dicyclohexyl-2-methylsuccinate, diethyl-2,3-diisopropylsuccinate, diethyl-2,3-bis(cyclohexylmethyl) succinate, diethyl-2,3-di-t-butylsuccinate, diethyl-2,3-diisobutylsuccinate, diethyl-2,3-dineopentylsuccinate, diethyl-2,3-diisopentylsuccinate, diethyl-2,3-(1-trifluoromethyl-ethyl) succinate, diethyl-2-isopropyl-3-isobutylsuccinate, diethyl-2-t-butyl-3-isopropylsuccinate, diethyl-2-isopropyl-3-cyclohexylsuccinate, diethyl-2-isopentyl-3-cyclohexylsuccinate, diethyl-2-cyclohexyl-3-cyclopentylsuccinate, diethyl-2,2,3,3-tetramethylsuccinate, diethyl-2,2,3,3-tetraethylsuccinate, diethyl-2,2,3, 3-tetrapropylsuccinate, diethyl-2,3-diethyl-2,3-diisopropylsuccinate, diisobutyl-2,3-bis(trimethylsilyl) succinate, diisobutyl-2,2-sec-butyl-3-methylsuccinate, diisobutyl-2-(3,3,3-trifluoropropyl)-3-methylsuccinate, diisobutyl-2,3-bis(2-ethylbutyl) succinate, diisobutyl-2,3-diethyl-2 isopropylsuccinate, diisobutyl-2,3-diisopropyl-2-methylsuccinate, diisobutyl-2,3-dicyclohexyl-2-methylsuccinate, diisobutyl-2,3-diisopropylsuccinate, diisobutyl-2,3-bis (cyclohexylmethyl) succinate, diisobutyl-2,3-di-t-butylsuccinate, diisobutyl-2,3-diisobutylsuccinate, diisobutyl-2,3-dineopentylsuccinate, diisobutyl-2,3-diisopentylsuccinate, diisobutyl-2,3-(1,1,1-trifluoro-2-propyl) succinate, diisobutyl-2,3-n-propylsuccinate, diisobutyl-2-isopropyl-3-isobutylsuccinate, diisobutyl-2-terbutyl-3-isopropylsuccinate, diisobutyl-2-isopropyl-3-cyclohexylsuccinate, diisobutyl-2-isopentyl-3-cyclohexylsuccinate, diisobutyl-2-n-propyl-3-(cyclohexylmethyl) succinate, diisobutyl-2-cyclohexyl-3-cyclopentylsuccinate, diisobutyl-2,2,3,3-tetramethylsuccinate, diisobutyl-2,2,3,3-tetraethylsuccinate, diisobutyl-2,2,3,3-tetrapropylsuccinate, diisobutyl-2,3-diethyl-2,3-diisopropylsuccinate, dineopentyl-2,3-bis(trimethylsilyl) succinate, dineopentyl-2,2-di-sec-butyl-3-methylsuccinate, dineopentyl 2-(3,3,3-trifluoropropyl)-3-methylsuccinate, dineopentyl-2,3-bis(2-ethylbutyl) succinate, dineopentyl 2,3-diethyl-2-isopropylsuccinate, dineopentyl-2,3-diisopropyl-2-methylsuccinate, dineopentyl-2,3-dicyclohexyl-2-methylsuccinate, dineopentyl-2,3-diisopropylsuccinate, dineopentyl-2,3-bis(cyclohexylmethyl) succinate, dineopentyl-2,3-di-t-butylsuccinate, dineopentyl-2,3-diisobutylsuccinate, dineopentyl-2,3-dineopentylsuccinate, dineopentyl-2,3-diisopentylsuccinate, dineopentyl 2,3-(1,1,1-trifluoro-2propyl) succinate, dineopentyl-2,3-n-propylsuccinate, dineopentyl-2-isopropyl-3-isobutylsuccinate, dineopentyl-2-t-butyl-3-isopropylsuccinate, dineopentyl-2-isopropyl-3-cyclohexylsuccinate, dineopentyl-2-isopentyl-3-cyclohexylsuccinate, dineopentyl-2-n-propyl-3-(cyclohexylmethyl) succinate, dineopentyl 2-cyclohexyl-3-cyclopentylsuccinate, dineopentyl-2,2,3,3-tetramethylsuccinate, dineopentyl 2,2,3,3-tetraethylsuccinate, dineopentyl-2,2,3,3-tetrapropylsuccinate, and/or dineopentyl-2,3-diethyl-2,3-diisopropylsuccinate.

The electron donor according to formula (4) may include two or four of the radicals $R^3$ to $R^6$ joined to the same carbon atom which are linked together to form a cyclic multivalent radical. Examples of suitable compounds include 1-(ethoxycarbonyl)-1-(ethoxyacetyl)-2,6-dimethylcyclohexane, 1-(ethoxycarbonyl)-1-(ethoxyacetyl)-2,5-dimethyl-cyclopentane, 1-(ethoxycarbonyl)-1-(ethoxyacetylmethyl)-2-methylcyclohexane, and/or 1-(ethoxycarbonyl)-1-(ethoxy (cyclohexyl) acetyl) cyclohexane.

Preferably, the internal electron donor may be selected from the group consisting of diethyl-2,3-diisopropylsuccinate, diisobutyl-2,3-diisopropylsuccinate, di-n-butyl-2,3-diisopropylsuccinate, diethyl-2,3-dicyclohexyl-2-methylsuccinate, diisobutyl-2,3-dicyclohexyl-2-methylsuccinate, diisobutyl-2,2-dimethylsuccinate, diethyl-2,2-dimethylsuccinate, diethyl-2-ethyl-2-methylsuccinate, diisobutyl-2-ethyl-2-methylsuccinate, diethyl-2-(cyclohexylmethyl)-3-ethyl-3-methylsuccinate, diisobutyl-2-(cyclohexylmethyl)-3-ethyl-3-methylsuccinate, and combinations thereof.

In conjunction with an internal donor, two or more external electron donors may also use in combination with a catalyst. The external electron donors may comprise an organic silicon compound of the general formula (5):

$$R^1{}_nSi(OR^2)_{4-n},\qquad(5)$$

wherein $R^1$ and $R^2$ independently represent a hydrocarbyl radical and n is 1, 2, or 3. Examples of the suitable organic silicon compounds include trimethylmethoxysilane, trimethylethoxysilane, dimethyldimethoxysilane, dimethyldimethoxysilane, dimethyldiethoxysilane, diiso-propyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyl-dimethoxysilane, cyclohexylmethyldiethoxysilane, ethyltrimethoxysilane, ethyltriethoxysilane, vinyltrimethoxysilane, methyltrimethoxysilane, n-propyl-triethoxysilane, decyltrimethoxysilane, decyltriethoxysilane, phenyltrimethoxysilane, [gamma]-chloropropyltri-methoxysilane, methyltriethoxysilane, ethyltriethoxysilane, vinyltriethoxysilane, t-butyltriethoxysilane, n-butyltriethoxysilane, iso-butyltriethoxysilane, phenyltriethoxysilane, gamma-aminopropyltriethoxysilane, chlorotriethoxysilane, vinyltributoxysilane, cyclo-hexyltrimethoxysilane, cyclohexyltriethoxysilane, 2-norbornanetriethoxysilane, 2-norbornanemethyldimethoxysilane, ethyl silicate, butyl silicate, trimethyl-phenoxysilane, methylallyloxysilane, vinyltris (beta-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

Preferably the external electron donors are selected from any one or more of methyltrimethoxysilane, ethyltrimethoxysilane, ethyltriethoxysilane, vinyltriethoxysilane, propyltrimethoxysilane, decyltrimethoxysilane, decyltriethoxysilane, propyltriethoxysilane, butyltriethoxysilane, phenyltriethoxysilane, vinyltrimethoxysilane, vinyltributoxysilane cyclohexyltrimethoxysilane, tetraethoxysilane, methylcyclohexyldimethoxysilane, propyltriethoxysilane, and/or dicyclopentyldimethoxysilane.

The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given external electron donor are typically directly and inversely related.

The above disclosed organic silicon compounds may be used such that a compound capable of being changed into such an organic silicon compound is added at the time of polymerizing or, if present, a pre-polymerization step, and the organic silicon compound may be formed in situ during the polymerization or the pre-polymerization of the olefin.

In any embodiment, the production of the polypropylene may include the use of two external electron donors. Suitable methods for using such external electron donors is disclosed in U.S. Pat. Nos. 6,087,459, and 6,686,433. The two external electron donors may be selected from any of the external electron donors described herein. But in a particular embodiment, the first external electron donor has the formula $R^1{}_2Si(OR^2)_2$, wherein each IV is independently a hydrocarbyl radical comprising from 1 to 10 carbon atoms in which the carbon adjacent to the Si is a secondary or a tertiary carbon atom, and wherein each $R^2$ is independently a hydrocarbyl radical comprising from 1 to 10 carbon atoms; and the second external electron donor has the formula $R^3{}_nSi(OR^4)_{4-n}$, wherein each $R^3$ and $R^4$ are independently a hydrocarbyl radical comprising from 1 to 10 carbon atoms, and n is 1, 2, or 3; wherein the second external electron donor is different than the first external electron donor.

In any embodiment, the first external electron donor and the second external electron donor may be selected from the group consisting of tetraethoxysilane, methylcyclohexyldimethoxysilane, propyltriethoxysilane, dicyclopentydimethoxysilane, and combinations thereof. The Ziegler-Natta catalyst system may comprise 2.5 mol % to less than 10, or 20, or 30, or 40, or 50 mol % of the first external electron donor and greater than 50, or 60, or 70, or 80, or 90 mol % of a second external electron donor based on total mol % of external electron donors. The external electron donor(s) are preferably present to within a range from 1, or 10 ppm to 50, or 60, or 80, or 100 ppm in the polymerization system or reactor.

The polymerization process may include a "pre-polymerization" step. The pre-polymerization may include utilizing the Ziegler-Natta catalyst system comprising the non-aromatic internal electron donor in combination with at least a portion of the organoaluminum co-catalyst wherein at least a portion of the external electron donors are present wherein the catalyst system is utilized in a higher concentration than utilized in the subsequent "main" polymerization process.

The concentration of the catalyst system in the main and/or pre-polymerization stages may be from 0.01 to 200 millimoles, or more preferably from 0.05 to 100 millimoles, calculated as a titanium atom, per liter of an inert hydrocarbon medium. The organoaluminum co-catalyst may be present in an amount sufficient to produce from 0.1 to 500 g, or more preferably from 0.3 to 300 g, of a polymer per gram of the titanium catalyst present, and may be present at from 0.1 to 100 moles, or more preferably from 0.5 to 50 moles, per mole of the titanium atom present in the catalyst component.

The pre-polymerization, if carried out, may be performed under mild conditions in an inert hydrocarbon medium in which an olefin and the catalyst components are present. Examples of the inert hydrocarbon medium used include aliphatic hydrocarbons, such as propane, butane, pentane, hexane, heptane, octane, decane, dodecane and kerosene; alicyclic hydrocarbons, such as cyclopentane, cyclohexane and methylcyclopentane; aromatic hydrocarbons, such as benzene, toluene and xylene; halogenated hydrocarbons, such as ethylene chloride and chlorobenzene; and mixtures thereof. Such inert hydrocarbons can be used in the main polymerization process as well. Also, the olefin(s) used in the pre-polymerization may be the same as an olefin to be used in the main polymerization. Most preferably propylene is used as the diluent. The reaction temperature for the pre-polymerization may be a point at which the resulting pre-polymerization does not dissolve substantially in the inert hydrocarbon medium, which may be from −20 to +100° C., or from −20 to +80° C., or from 0 to 40° C.

During the pre-polymerization, a molecular weight controlling agent such as hydrogen may be used. The molecular weight controlling agent may desirably be used in such an amount that the polymer obtained by pre-polymerization has properties consistent with the intended product. The pre-polymerization may be carried out so that from 0.1 to 1000 g, or more preferably from 0.3 to 300 g, of a polymer forms per gram of the titanium catalyst.

The main polymerization ("polymerization") of the propylene comonomers (preferably ethylene) may be carried out in the gaseous phase, the liquid phase, bulk phase, slurry phase, or any combination thereof. Preferably the polymerization is carried out by slurry polymerization wherein the inert hydrocarbon may be used as a reaction solvent, or an olefin liquid under the reaction conditions may be used as the solvent. Most preferably the propylene monomer is used as the diluent in the slurry polymerization process. The polymerization process includes contacting the titanium catalyst component, the one or more internal electron donors, the organoaluminum co-catalyst, and the two or more external electron donors with each other at the time of the polymerization, before the polymerization, for example, at the time of the pre-polymerization, or a combination thereof. In contacting them before the polymerization, any two or more of these components may be freely selected and contacted. Two or more of the components may be contacted individually or partly and then contacted with each other in total to produce the catalyst system. In any case, hydrogen may be used during polymerization to control the molecular weight and other properties of the resulting polymer.

In any embodiment, the polymerization conditions include a polymerization temperature within a range from 20, or 40, or 60° C. to 120, or 140, or 160, or 180, or 200° C., and a pressure from atmospheric pressure up to 100 kg/cm$^2$, or more preferably within a range from 2, or 6 kg/cm$^2$ to 20, or 50, or 100 kg/cm$^2$. The polymerization process may be carried out batch-wise, semi-continuously, or continuously, and/or in two or more reactors in series. The conditions in each reactor if carried out in more than one reactor may be the same or different. The reaction slurry (homopolymer granules in bulk propylene) may then be removed from the reactor and the polymer granules continuously separated from the liquid propylene. The polymer granules may then be separated from the unreacted monomer to produce a granular product for compounding and/or mechanical properties.

The polypropylene can be formed into useful articles. For instance, in any embodiment a foamed article can be formed from the polypropylene or polypropylene in a blend with another polymer and/or additive (e.g., filler, anti-oxidant, etc.). Foaming agents useful in forming foamed articles described herein may be normally gaseous, liquid or solid compounds or elements, or mixtures thereof. These foaming agents may be characterized as either physically-expanding or chemically decomposing. Of the physically expanding foaming agents, the term "normally gaseous" is intended to mean that the expanding medium employed is a gas at the temperatures and pressures encountered during the preparation of the foamable compound, and that this medium may be introduced either in the gaseous or liquid state as convenience would dictate. Such agents can be added to the polypropylenes by blending the dry polymer with the foaming agent followed by melt extrusion, or by blending the agents in the polymer melt during extrusion. The foaming agent, especially gaseous agent, may be blended with the polymer melt as it exits the melt extruder or mold that is used for forming the foamed articles.

Included among exemplary, normally gaseous and liquid foaming agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane, trifluorochloromethane, trichloromonofluoromethane, ethyl fluoride, ethyl chloride, 2,2,2-trifluoro-1,1-dichloroethane, 1,1,1-trichloroethane, difluoro-tetrachloroethane, 1,1-dichloro-1-fluoroethane, 1,1-difluoro-1-chloroethane, dichloro-tetrafluoroethane, chlorotrifluoroethane, trichlorotrifluoroethane, 1-chloro-1,2,2,2-tetrafluoroethane, 1,1-difluoroethane, 1,1,1-trifluoroethane, 1,1,1,2-tetrafluoroethane, perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof. Other normally gaseous and liquid foaming agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as nitrogen, argon, neon or helium, can also be used as foaming agents.

Solid, chemically decomposable foaming agents, which decompose at elevated temperatures to form gasses, can be used to expand the polypropylenes. In general, the decomposable foaming agent will have a decomposition temperature (with the resulting liberation of gaseous material) from 130° C. to 200, or 250, or 300, or 350° C. Exemplary chemical foaming agents include azodicarbonamide, p,p'-oxybis(benzene) sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazide compounds as well as various acid/bicarbonate compounds which decompose when heated. Representative volatile liquid foaming agents include isobutane, difluoroethane or blends of the two. For decomposable solid foaming agents, azodicarbonamide is preferred, while for inert gasses, carbon dioxide is preferred.

The art of producing foam structures is known, especially for styrenic compositions. The foamed articles of the present invention may take any physical configuration known in the art, such as sheet, plank, other regular or irregular extruded profile, and regular or irregular molded bun stock. Exemplary of other useful forms of foamed or foamable objects known in the art include expandable or foamable particles, moldable foam particles, or beads, and articles formed by expansion and/or consolidation and fusing of such particles. In any embodiment the foamable article or polypropylenes may be cross-linked prior to expansion, such as for the process of free-radical initiated chemical cross-linking or ionizing radiation, or subsequent to expansion. Cross-linking subsequent to expansion may be effected if desired by exposure to chemical cross-linking agents or radiation or, when silane-grafted polymers are used, exposure to moisture optionally with a suitable silanolysis catalyst.

Illustrative, but non-limiting, of methods of combining the various ingredients of the foamable polypropylenes include melt-blending, diffusion-limited imbibition, liquid-mixing, and the like, optionally with prior pulverization or other particle-size reduction of any or all ingredients. Melt-blending may be accomplished in a batchwise or continuous process, and is preferably carried out with temperature control. Furthermore, many suitable devices for melt-blending are known to the art, including those with single and multiple Archimedean-screw conveying barrels, high-shear "Banbury" type mixers, and other internal mixers. The object of such blending or mixing, by means and conditions which are appropriate to the physical processing characteristics of the components, is to provide therein a uniform mixture. One or more components may be introduced in a step-wise fashion, either later during an existing mixing operation, during a subsequent mixing operation or, as would be the case with an extruder, at one or more downstream locations into the barrel.

Expandable or foamable polypropylenes will have a foaming agent incorporated therein, such as a decomposable or physically expandable chemical blowing agent, so as to effect the expansion in a mold upon exposure of the composition to the appropriate conditions of heat and, optionally, the sudden release of pressure. The polypropylenes find many uses as foamed articles including automotive components, insulation and other construction components, food containers, sports equipment, and other domestic and commercial uses.

The polypropylenes can also be thermoformed to make useful thermoformed articles. Thermoforming is a manufacturing process where the polypropylene sheet is heated to a pliable forming temperature, formed to a specific shape in a mold, and trimmed to create a usable product. The sheet, or "film" when referring to thinner gauges and certain material types, is heated in an oven to a high-enough temperature that permits it to be stretched into or onto a mold and cooled to a finished shape. Its simplified version is vacuum forming. The polypropylenes described herein can desirably be formed into films or sheets suitable for thermoforming processes.

In any embodiment, a small tabletop or lab size machine can be used to heat small cut sections of polypropylene sheet and stretch it over a mold using vacuum. This method is often used for sample and prototype parts. In complex and high-volume applications, very large production machines can be utilized to heat and form the polypropylene sheet and trim the formed parts from the sheet in a continuous high-speed process, and can produce many thousands of finished parts per hour depending on the machine and mold size and the size of the parts being formed. The polypropylenes described herein are suitable for both types of thermoforming.

One desirable type of thermoforming is thin-gauge thermoforming. Thin-gauge thermoforming is primarily the manufacture of disposable cups, containers, lids, trays, blisters, clamshells, and other products for the food, medical, and general retail industries. Thick-gauge thermoforming includes parts as diverse as vehicle door and dash panels, refrigerator liners, utility vehicle beds, and plastic pallets. Heavy-gauge forming utilizes the same basic process as continuous thin-gauge sheet forming, typically draping the heated plastic sheet over a mold. Many heavy-gauge forming applications use vacuum only in the form process, although some use two halves of mating form tooling and include air pressure to help form.

In any embodiment, a sheet comprising (or consisting essentially of) the polypropylene is fed from a roll or from an extruder into a set of indexing chains that incorporate pins, or spikes, that pierce the sheet and transport it through an oven for heating to forming temperature. The heated sheet then indexes into a form station where a mating mold and pressure-box close on the sheet, with vacuum then applied to remove trapped air and to pull the material into or onto the mold along with pressurized air to form the plastic to the detailed shape of the mold. Plug-assists are typically used in addition to vacuum in the case of taller, deeper-draw formed parts in order to provide the needed material distribution and thicknesses in the finished parts. In any case, after a short form cycle, a burst of reverse air pressure is actuated from the vacuum side of the mold as the form tooling opens, commonly referred to as air-eject, to break the vacuum and assist the formed parts off of, or out of, the mold. A stripper plate may also be utilized on the mold as it opens for ejection of more detailed parts or those with negative-draft, undercut areas. The polypropylene sheet containing the formed parts then indexes into a trim station on the same machine, where a die cuts the parts from the remaining sheet web, or indexes into a separate trim press where the formed parts are trimmed. The sheet web remaining after the formed parts are trimmed is typically wound onto a take-up reel or fed into an inline granulator for recycling.

Generally, the inventive polypropylenes find use in making many thermoformed articles such as automotive components, construction components, electronic devices, medical equipment, sports equipment, food containers, appliances, and other domestic and commercial uses. Similarly, the polypropylenes can find use thermoformed articles made from injection molding, blow molding, and rotational molding processes.

In a particularly preferred embodiment is a thermoformed article, foamed or not foamed, comprising polypropylene comprising (or consisting essentially of, or consisting of) within a range from 0.1 wt % to 4 wt % ethylene derived units, one or more clarifiers, or both, and having any of the features described herein for the polypropylene such as a Mz/Mw of at least 4, or 4.5, or 5, or 5.5, or 6; a Mw/Mn value within a range from 8, or 9, or 10, or 11 to 12, or 14, or 16, or 18; and an MFR (230° C./2.16 kg) within a range from 0.5, or 1 g/10 min to 10, or 20 g/10 min.

Preferably, the inventive polypropylenes are "reactor grade", meaning polymers not having undergone any post-reactor process to change its chemical structure, such as by reactive extrusion, electron-beam or ultra-violet radiation, or silane grafting. A polypropylene is "reactor grade" if no byproducts of peroxide reactions (visbreaking or cross-linking/long chain branch inducing) can be detected, and no grafted moieties are detected, and no long chain branching and/or cross-linked chains are detected. Byproducts of peroxide reactions include alcohols and ketones and can be detected by NMR. Long chain branching can be determined using the intrinsic viscosity ($g'_{vis}$) of a polymer, which should have a value of less than 0.98, or 0.97 for a branched and/or cross-linked polypropylene. The $g'_{vis}$ value for a polymer can be determined using a high temperature viscometer, in conjunction with GPC methods described further herein.

Nonetheless, in any embodiment, the articles formed from the polypropylenes, or blends thereof, may be cross-linked to enhance performance (such as thermal stability and durability). In any embodiment, any of these articles may be cross-linked, which can be effected by any means, including but not limited to chemical cross-linking (using cross-linking agents containing sulfur, peroxide, amine, halide, etc.) and radiation induced cross-linking (using radiation types such as electrons, x-rays, ions, neutrons, gamma-radiation, and ultraviolet). In a most preferred embodiment however, the polypropylenes and articles formed therefrom are not cross-linked.

In any embodiment, blends of polypropylenes described herein, cross-linked or not, can comprise any combination of second or third polymer(s) such as polyethylene, polypropylene, ethylene-propylene copolymers, butyl rubber, polyisoprene, polybutadiene, polystyrene, styrene butadiene, polyamides, polyesters, polyurethanes, polyacrylates, and combinations thereof. In any embodiment, the polypropylene comprises within a range from 5, or 10 to 20, or 30, or 40, or 50 wt % of the second polymer as a blend. The polypropylene may also be associated with one or more of the second polymers in an article as co-components of the article, such as layers or parts of the article.

In particular, from 5, or 10 to 30, or 40, or 50 wt % of a low molecular weight polyolefin, by weight of the blend of polyolefin and polypropylene, may be added to the polypropylene by melt extrusion or any other blending means. The "low molecular weight polyolefin" is a polyolefin polymer having a weight average molecular weight of no more than 80,000, or 100,000 g/mole, preferably comprising ethylene and C4 to C10 derived units, most preferably comprising propylene and optionally ethylene derived units. In any embodiment, the low molecular weight polyolefin has a melt flow rate (230° C./2.16 kg) of at least 50, or 100, or 200, or 500 g/10 min, or within a range from 50, or 100, or 200, or 500 g/10 min to 1,500, or 2,000, or 5,000 g/10 min. In any embodiment, the low molecular weight polyolefin is selected from the group consisting of polypropylene homopolymers, polypropylene copolymers, polyethylene homopolymers, polyethylene copolymers, and blends thereof. Most preferably, the low molecular weight polyolefin is a polypropylene homopolymer, meaning that it comprises less than 1, or 2 wt % ethylene or C4 to C10 derived units. In any embodiment, the low molecular weight polyolefin has an Mw/Mn of less than 5, or 4, or 3.

The polypropylene may be subject to any number of post-reactor processing steps, such as reactive extrusion processes described in WO 2016/126429 A1. Thus in any embodiment the polypropylene is combined with an organic peroxide, especially a short half-life peroxide in a melt extrusion process to produce a branched polypropylene, such polypropylenes typically having an enhanced melt strength and extensional viscosity. Preferably, this takes place in the absence of any additional monomers or cross-linking agents such as butadiene, 1,9-decadiene, norbornenes, or other diene-type monomers known in the art. Useful organic peroxides include those that are short half-life peroxides such as di-sec-butyl peroxydicarbonate, diisopropyl peroxydicarbonate, dicyclohexyl peroxydicarbonate, di(4-tert-butylcyclohexyl) peroxydicarbonate, dicetyl peroxydicarbonate, dibutyl peroxydicarbonate, di(2-ethylhexyl) peroxydicarbonate, didodecyl peroxydicarbonate, diicosyl peroxydicarbonate, and ditetracosyl peroxydicarbonate. Also, the polypropylene may be treated with a long half-life peroxide such as 2,5-dimethyl-2,5-di(tert-butylperoxy)hexane, 2,5-bis(tert-butylperoxy)-2,5-dimethylhexane, di-tert-butyl peroxide, and dicumyl peroxide to effect "visbreaking" of the polypropylene as is known in the art.

The features described herein can be combined with one another to describe the polypropylene, the process of making the polypropylene, and the articles made therefrom. For example, in any embodiment is a polypropylene comprising (or consisting essentially of, or consisting of) within a range from 0.1 wt % to 4 wt % ethylene derived units, one or more clarifiers, or both; and having a Mz/Mw of at least 4, or 4.5, or 5, or 5.5, or 6; a Mw/Mn value within a range from 8, or 9, or 10, or 11 to 12, or 14, or 16, or 18; and an MFR (230° C./2.16 kg) within a range from 0.5, or 1 g/10 min to 10, or 20 g/10 min EXAMPLES A base polypropylene was produced in a slurry polymerization reactor by contacting propylene, and optionally ethylene as stated in the final weight percentages in the tables below, with an Avant™ ZN168 catalyst (Equistar Chemical Company, Houston Tex.), triethylaluminum (TEAL), and propyltriethoxysilane and dicyclopentyldimethoxysilane as external donors, and hydrogen to a final MFR as stated in the tables. The donor concentration in Table 1A refers the total donor concentration. Two sets of experiments were performed, the first set using a 3.4-4 MFR base polypropylene, the results of which are set forth in Tables 1A and 1B, and the second set a 1.8-2 MFR polypropylene as set forth in Tables 2A to 2C.

Also, in the tables, "low donor" means the total external donor concentration of the one, two or more donors was 10-20 ppm, and "high donor" means the concentration was 30-40 ppm.

Clarifiers are combined with the polypropylene by melt blending in an extruder. The clarifiers in the tables are commercially available from Milliken & Company (Spartanburg, S.C.). The samples in the tables below were combined with the clarifiers in a Werner Pfleiderer ZSK30 melt extruder under nitrogen flow, a die pressure of from 450 to 480 psi, a screw speed of from 140 to 180 rpm, at a feed throat temperature of from 180 to 190° C., having 5-6 zones of gradual increase in temperature up to the final melt temperature, the melt temperature, measured at the die opening with a thermocouple, within a range from 238 to 248° C. The amounts of clarifiers added in the tables are the final amount in the polypropylene. Additional additives were added to the base polypropylene to a concentration in the polypropylene of about 200 ppm Irganox™ 1010, about 200 ppm Irgafos™ 168, about 15 ppm Irganox™ E-201 (Vitamin E), about 50 ppm calcium stearate, and about 50 ppm DHT-4V™ (hydrotalcite).

In the tables, "PP6262" refers to a 2.8 MFR ExxonMobil PP6262 propylene homopolymer (ExxonMobil Chemical Company, Houston Tex.), and "PP6272" refers to a 2.8 MFR ExxonMobil PP6272NE1 propylene homopolymer (ExxonMobil Chemical Company, Houston Tex.).

Melt Flow Rate (MFR).

ASTM D1238 at 230° C. with 2.16 kg load, referred to as "230° C./2.16 kg" in the specification and claims.

Molecular Weight Determinations.

Given that polymers are a collection of individual molecules each having its own molecular weight, the expression of the molecular weight of the collective "polymer" takes several statistical forms. The number average molecular weight (Mn) of the polymer is given by the equation $\Sigma n_i M_i / \Sigma n_i$, where "M" is the molecular weight of each polymer "i". The weight average molecular weight (Mw), z-average molecular weight (Mz), and Mz+1 value are given by the equation $\Sigma n_i M_i^{n+1} / \Sigma n_i M_i^n$, where for Mw, n=1, for Mz, n=2, and for Mz+1, n=3, where $n_i$ in the foregoing equations is the number fraction of molecules of molecular weight $M_i$. Reported and claimed values for Mn are ±2 kg/mole, for Mw are ±5 kg/mole, and for Mz are ±50 kg/mole. The expression "Mw/Mn" is the ratio of the weight average molecular weight (Mw) to the number average molecular weight (Mn), while the "Mz/Mw" is the ratio of the Mw to the Mz, an indication of the amount of high molecular weight component to the polypropylene.

The Mw, Mn and Mz values were determined by using a High Temperature GPC (Agilent PL-220), equipped with three in-line detectors, a differential refractive index detector ("DRI"), a light scattering ("LS") detector, and a viscometer. Detector calibration is described in a paper by T. Sun, P. Brant, R. R. Chance, and W. W. Graessley, in 34(19) MACROMOLECULES, 6812-6820 (2001) and references therein. Three Agilent PLgel 10 μm Mixed-B LS columns were used for the GPC tests herein. The nominal flow rate was 0.5 mL/min, and the nominal injection volume was 300 μL. The various transfer lines, columns, viscometer and differential refractometer (the DRI detector) were contained in an oven maintained at 145° C. Solvent for the experiment was prepared by dissolving 6 grams of butylated hydroxytoluene as an antioxidant in 4 liters of Aldrich reagent grade 1,2,4-trichlorobenzene ("TCB"). The TCB mixture was then filtered through a 0.1 μm polytetrafluoroethylene filter. The TCB was then degassed with an online degasser before entering the GPC. Polymer solutions were prepared by placing dry polymer in a glass container, adding the desired amount of TCB, then heating the mixture at 160° C. with continuous shaking for about 2 hours. All quantities were measured gravimetrically. The TCB densities used to express the polymer concentration in mass/volume units were 1.463 g/ml at 23° C. and 1.284 g/ml at 145° C. The injection concentration was from 0.5 to 2.0 mg/ml, with lower concentrations being used for higher molecular weight samples. Prior to running each sample the DRI detector and the viscometer were purged. The flow rate in the columns was then increased to 0.5 ml/minute, and the DRI was allowed to stabilize for 8 hours before injecting the first sample. The LS laser was turned on at least 1 to 1.5 hours before running the samples. The concentration, c, at each point in the chromatogram was calculated from the baseline-subtracted DRI signal, $I_{DRI}$, using the following equation:

$$c = K_{DRI} I_{DRI} / (dn/dc),$$

where $K_{DRI}$ is a constant determined by calibrating the DRI, and (dn/dc) is the incremental refractive index for the system. The refractive index, n, was 1.500 for TCB at 145° C. and λ was 690 nm. Units of molecular weight are expressed in kg/mole or g/mole, and intrinsic viscosity is expressed in dL/g.

The LS detector was a Wyatt Technology High Temperature Dawn Heleos. The molecular weight, M, at each point in the chromatogram was determined by analyzing the LS output using the Zimm model for static light scattering (W. Burchard & W. Ritchering, "Dynamic Light Scattering from Polymer Solutions," in 80 PROGRESS IN COLLOID & POLYMER SCIENCE, 151-163 (Steinkopff, 1989)) and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from DRI method, and the value of "n" is as above.

Branching of a polypropylene, the determination of $g'_{vis}$, is determined as follows. A high temperature Viscotek Corporation viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity ($\eta_s$) for the solution flowing through the viscometer was calculated from their outputs. The intrinsic viscosity, [η], at each point in the chromatogram was calculated from the following equation:

$$\eta_s = c[\eta] + 0.3(c[\eta])^2,$$

where "c" is concentration and was determined from the DRI output. The average intrinsic viscosity, $[\eta]_{avg}$, of the sample was calculated using the following equation:

$$[\eta]_{avg} = \frac{\sum c_i [\eta]_i}{\sum c_i},$$

where the summations are over the chromatographic slices, i, between the integration limits. For data processing, the Mark-Houwink constants used were K=0.000579 and a=0.695.

Thermal Properties.

The following DSC procedure was used to determine the crystallization temperature (Tc) and melting point temperatures ($T_m$) of the polypropylenes. Differential Scanning calorimetry (DSC) was carried out on the blends using a PerkinElmer DSC 8000. The sample was placed in a zero hermetic pan and encapsulated with lid using a pan press. An empty reference pan sits on a symmetric platform in the DSC cell. Heat flow was measured by comparing the difference in temperature across the sample and the reference. Sample sizes were from 3.5 mg to 5 mg and were heated at rate of 10° C./min from −20° C. to 220° C. in nitrogen gas flowing at a rate of 50 ml/min. The samples were first cooled from 20° C. to −20° C., then heated to 220° C. to remove any thermal history. Then the samples were cooled from 220° C. to −20° C., then heating back up from −20° C. to 220° C. in the second heating processes. All the DSC plots on first cooling and second heating were recorded. The melting point temperature, $T_m$, was recorded during the second heating and is the peak heat flow (zero inflection), and the crystallization temperature, $T_c$, was recorded during the first cooling at the peak minimum (zero inflection).

Haze.

Haze (wide-angle scattering) is defined as the percentage of transmitted light passing through the sample that is deflected by more than 2.5°, completed as designated in ASTM D1003-13.

Clarity.

Also ASTM D1003. Clarity (narrow-angle scattering) is defined as the percentage of transmitted light passing through the sample that is deflected at angles of less than 2.5°, completed with the same instrument as Haze.

Flexural Modulus.

ASTM D790(A) using 0.05 in/min speed, completed on a Type 1 Tensile bars molded per ASTM D4101 on a Sumitomo 100 ton electric injection molder. Also tested using ISO 37, Type 3 tensile bar, test speed at 1 mm/min and span of 30 mm, where tensile bars were molded on a BOY injection molder with an injection pressure of 900 psi, hold pressure of 725 psi, plasticizing pressure of 200 psi, hold time of 10 sec, and 1.1 to 1.8 mm fill cushion.

TABLE 1A

Exemplary HMS Properties of the First Examples

| Description | Donor, ppm | MFR (g/10 mins) | Mn (g/mol) | Mw (g/mol) | Mz (g/mol) | Mz + 1 (g/mol) | Mw/Mn | Mz/Mw |
|---|---|---|---|---|---|---|---|---|
| low donor, No C2 | 10 | 3.9 | 32,963 | 460,114 | 2,613,024 | 5,539,760 | 14.0 | 5.7 |
| low donor, 0.6 wt % C2 | 10 | 3.9 | 33,511 | 440,477 | 2,415,719 | 5,261,434 | 13.1 | 5.5 |
| low donor, 1.3 wt % C2 | 10 | 3.4 | 39,996 | 450,371 | 2,508,731 | 5,515,230 | 11.3 | 5.6 |
| high donor, 1.3 wt % C2 | 40 | 2.9 | 39,647 | 463,664 | 2,423,028 | 5,280,849 | 11.7 | 5.2 |
| high donor, No C2 | 40 | 4.0 | 35,033 | 459,508 | 2,583,990 | 5,528,207 | 13.1 | 5.6 |

TABLE 1B

Haze, Clarity and Flexural Modulus of Exemplary HMS Polypropylenes

| Description | Clarity (%) | Haze (%) | ASTM Flexural Modulus, kpsi |
|---|---|---|---|
| low donor, No C2 | 69 | 58.8 | 276 |
| low donor, 0.6 wt % C2 | 81.3 | 52.5 | 243 |
| low donor, 1.3 wt % C2 | 86.6 | 47.2 | 224 |
| high donor, 1.3 wt % C2 | 88.2 | 47.8 | 230 |
| high donor, No C2 | 94.3 | 47.6 | 299 |

TABLE 2A

Base HMS Polypropylene Descriptions used in the Second Examples

| Sample | Base Polypropylene Description |
|---|---|
| 3-5 | HMS PP having an MFR of about 2 g/10 min, homopolymer (0 wt % ethylene) |
| 6-9 | Mixture of HMS PP having an MFR of about 2 g/10 min, and an ethylene content of about 0.6 wt % |
| 10, 11 | Mixture of HMS PP having an MFR of about 1.8 g/10 min and an ethylene content of about 1.3 wt % |

TABLE 2B

Description of Comparative and Inventive Clarified compositions

| number | Description | Millad™ 3988, ppm | Hyperform™ HPN-600ei, ppm | Millad™ NX8000, ppm | target wt % C2 | Haze % | DSC $T_c$, °C. | DSC $T_m$, °C. |
|---|---|---|---|---|---|---|---|---|
| 1 | PP6262 | 200 | — | — | 0.55 | 15 | — | — |
| 2 | PP6272NE1 | — | 200 | — | 0.55 | 27 | — | — |
| 3 | No C2 | — | — | — | 0 | 58 | 118 | 165 |
| 4 | No C2 | — | — | 2000 | 0 | 41 | 123 | 164 |
| 5 | No C2 | — | — | 4000 | 0 | 20 | 130 | 165 |
| 6 | 0.6 wt % C2, low donor | — | — | — | 0 | 53 | 114 | 158 |
| 7 | 0.6 wt % C2, low donor | — | — | 2000 | 0.6 | 29 | 124 | 160 |
| 8 | 0.6 wt % C2, low donor | — | — | 4000 | 0.6 | 15 | 128 | 161 |
| 9 | 0.6 wt % C2, low donor | — | 400 | — | 0.6 | 26 | 122 | 160 |
| 10 | 1.3 wt % C2 | — | — | — | 1.3 | 42 | 112 | 154 |
| 11 | 1.3 wt % C2 | — | — | 4000 | 1.3 | 15 | 125 | 157 |

TABLE 2C

Flexural Modulus (1% Secant) Values of Comparative and Inventive Compositions

| Number | ASTM D790 (A), kpsi | ASTM D790 (A), MPa | ISO 37, kpsi | ISO 37, Kpsi |
|---|---|---|---|---|
| 1 | 248 | — | — | — |
| 2 | 246 | — | — | — |
| 3 | 276 | 1838 | 268 | 268 |
| 4 | 296 | 2013 | 287 | 287 |
| 5 | 324 | 2191 | 314 | 314 |
| 6 | 250 | 1751 | 251 | 251 |
| 7 | 275 | 1872 | 265 | 265 |
| 8 | 290 | 2004 | 285 | 285 |
| 9 | 269 | 1915 | 269 | 269 |
| 10 | 224 | 1540 | 214 | 214 |
| 11 | 243 | 1713 | 241 | 241 |

As can be seen from the data in Tables 2B and 2C, the inventive compositions show improved clarity/haze (high clarity, low haze) with high stiffness as demonstrated in the flexural modulus values. This is achieved in any embodiment in reactor grade pellets that have been produced in a single-stage slurry process using a Ziegler-Natta type catalyst. By "single-stage" what is meant is that the conditions in the reactor(s) such as temperature and hydrogen and/or other chain terminating agent concentration are not changed to effect any property of the final polypropylene from the catalyst and propylene entering the reactor to the polypropylene leaving the reactor. For instance, the base polypropylene pellets used herein were produced in a slurry reactor having two separate loops, but conditions in each loop were substantially the same.

As used herein, "consisting essentially of" means that the claimed article or polymer or polymer blend includes only the named components and no additional components that will alter its measured properties by any more than 20, or 15, or 10%, and most preferably means that additional components are present to a level of less than 5, or 4, or 3, or 2 wt % by weight of the composition. Such additional components can include, for example, fillers, nucleators (different from the "clarifier" that may be present), colorants, antioxidants, alkyl-radical scavengers (preferably vitamin E, or other tocopherols and/or tocotrienols), anti-UV agents, acid scavengers, curatives and cross-linking agents, aliphatic and/or cyclic containing oligomers or polymers (often referred to as hydrocarbon resins), and other additives well known in the art. As it relates to a process, the phrase "consisting essentially of" means that there are no other process features that will alter the claimed properties of the polymer, polymer blend or article produced therefrom by any more than 10, 15 or 20%.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A polypropylene that is reactor grade and has
   a flexural modulus of at least 200 kpsi (1380 MPa) (0.05 in/min ASTM D790(A)),
   an Mz/Mw of at least 4,
   an Mw/Mn of at least 8,
   a Mn ranging from 20 kg/mole to 80 kg/mole, a Mw ranging from 300 kg/mole to 800 kg/mole, and a Mz ranging from 1000 kg/mole to 3500 kg/mole;
   wherein the polypropylene comprises:
   (i) within a range from 0.1 wt % to 4 wt % ethylene derived units,
   (ii) one or more clarifiers, or
   (iii) both (i) and (ii).

2. The polypropylene of claim 1, wherein the polypropylene has a melt flow rate (MFR, 230° C./2.16 kg) within a range from 0.5 g/10 min to 20 g/10 min.

3. The polypropylene of claim 1, wherein the one or more clarifiers are present within a range from 50 ppm to 5000 ppm.

4. The polypropylene of claim 1, wherein the polypropylene has an Mz+1 value of at least 4,800 kg/mole.

5. The polypropylene of claim 1, wherein the polypropylene has a melting point temperature ($T_m$) of at least 154° C.

6. The polypropylene of claim 1, wherein the polypropylene has a crystallization temperature ($T_c$) of at least 110° C.

7. The polypropylene of claim 1, wherein the polypropylene has a clarity of at least 80%.

8. The polypropylene of claim 1, wherein the polypropylene has a haze of less than 60%.

9. The polypropylene of claim 1, wherein the polypropylene is made by combining propylene and optionally a comonomer with a Ziegler-Natta catalyst and at least two external electron donors, wherein a concentration of the at least two external electron donors is within a range from 1 to 100 ppm.

10. The polypropylene of claim 9, wherein the concentration of the at least two external electron donors is decreased to reduce a haze of the polypropylene.

11. The polypropylene of claim 9, wherein a level of the comonomer is increased to reduce a haze of the polypropylene.

12. The polypropylene of claim 9, wherein hydrogen is combined with the propylene and the optional comonomer, and a level of the hydrogen is kept constant while the propylene and the optional comonomer are combined with the Ziegler-Natta catalyst.

13. The polypropylene of claim 1, wherein the polypropylene is combined with an organic peroxide in a melt extrusion process to produce a branched polypropylene.

14. The polypropylene of claim 1, further comprising from 5 to 50 wt % of a low molecular weight polyolefin.

15. The polypropylene of claim 1, further comprising a foaming agent.

16. A thermoformed article comprising the polypropylene of claim 1.

17. A polypropylene that is reactor grade and has
a MFR (230° C./2.16 kg) within a range from 0.5 g/10 min to 20 g/10 min,
an $M_z/M_w$ of at least 4,
an $M_w/M_n$ of 8 to 18,
a $M_n$ ranging from 20 kg/mole to 80 kg/mole, a $M_w$ ranging from 300 kg/mole to 800 kg/mole, and a $M_z$ ranging from 1000 kg/mole to 3500 kg/mole;
wherein the polypropylene comprises:
(i) within a range from 0.1 wt % to 4 wt % ethylene derived units,
(ii) one or more clarifiers, or
(iii) both (i) and (ii).

18. The polypropylene of claim 17, wherein the polypropylene has a melt strength (190° C.) of at least 5 cN.

19. The polypropylene of claim 17, wherein the polypropylene has a haze of less than 60%.

20. The polypropylene of claim 17, wherein the polypropylene is made by combining propylene and a comonomer with a Ziegler-Natta catalyst and at least two external electron donors, wherein a concentration of the at least two external electron donors is within a range from 1 to 100 ppm.

21. The polypropylene of claim 20, wherein the concentration of the at least two external electron donors is decreased to reduce a haze of the polypropylene.

22. The polypropylene of claim 20, wherein a level of the comonomer is increased to reduce a haze of the polypropylene.

23. The polypropylene of claim 17, further comprising a foaming agent.

24. A thermoformed article comprising the polypropylene of claim 17.

* * * * *